United States Patent [19]
Dimatteo, Jr.

[11] Patent Number: 5,820,224
[45] Date of Patent: Oct. 13, 1998

[54] MOTOR VEHICLE WHEEL AND WHEEL SUPPORT ASSEMBLY WITH KNOCK-OFF NUT

[75] Inventor: George B. Dimatteo, Jr., Paramount, Calif.

[73] Assignee: L.A. Wire Wheel, Inc., Paramount, Calif.

[21] Appl. No.: 802,565

[22] Filed: Feb. 19, 1997

[51] Int. Cl.[6] ...................................................... B60B 1/06
[52] U.S. Cl. ..................... 301/35.58; 301/105.1
[58] Field of Search ................. 301/9.1, 35.53, 301/35.55, 35.56, 35.58, 35.63, 35.62, 105.1, 111, 124.1, 126, 131

[56] References Cited

U.S. PATENT DOCUMENTS

| | | | |
|---|---|---|---|
| 1,377,861 | 5/1921 | Tibbetts | 301/35.58 |
| 1,424,211 | 8/1922 | Pugh | 301/35.58 |
| 1,582,515 | 4/1926 | Fine | 301/35.58 |
| 1,609,675 | 12/1926 | Vernon | 301/35.58 |
| 1,813,431 | 7/1931 | Shoemaker | 301/35.63 |
| 5,352,026 | 10/1994 | Snook | 301/111 X |
| 5,492,391 | 2/1996 | Snook | 301/35.58 |
| 5,584,537 | 12/1996 | Miansian | 301/35.63 |

*Primary Examiner*—Russell D. Stormer
*Attorney, Agent, or Firm*—Edgar W. Averill, Jr.

[57] ABSTRACT

A motor vehicle wheel and wheel support assembly for holding a wheel onto a motor vehicle which wheel may be quickly removed by unscrewing a single central knock-off nut. The assembly has a hub adapter which is bolted to the brake drum or brake disk using the conventional lug bolts and lug nuts. The hub adapter has an angled outer flange in the shape of a decagon or other multi-sided polygon. The outer surface has a slight angle such as five (5) degrees with respect to the central axis. The wheel has a mating shape and the hub adapter has a threaded extension which accepts the knock-off nut. When the wheel is placed so that its angled decagon mates with the angled decagon of the hub adapter, it may be securely held to the hub adapter by tightening a knock-off nut against the outer surface of the wheel. Thus, the wheel may be removed from the motor vehicle by simply removing the knock-off nut.

6 Claims, 3 Drawing Sheets

MOTOR VEHICLE WHEEL AND WHEEL SUPPORT ASSEMBLY WITH KNOCK-OFF NUT

BACKGROUND OF THE INVENTION

The field of the invention is motor vehicle wheels and the invention relates more particularly to wheels of the type which are held by a single central nut to the vehicle. It is well known in race cars and also in many classic automobiles to hold a wheel to a motor vehicle by a single central knock-off nut. Such a holding system is aesthetically attractive and also permits the speedy removal of a wheel and the replacement with a spare wheel.

An early design is shown in U.S. Pat. No. 1,609,148. This design uses a wheel with a hub which has a series of equally spaced projections 20. A hub shell has a flange provided with notches which mesh with the projections on the hub. U.S. Pat. No. 2,046,779 shows a wheel which is held onto an axle by a tapered portion which appears to be scored. A knock-off nut holds the wheel to the axle.

U.S. Pat. No. 4,478,458 shows a wheel held to a hub adapter and secured against rotation by splines 39 which engage with splines 41 on the wheel. U.S. Pat. No. 5,352,026 utilizes a hub adapter with engagement bars 39 which fit within slots 72 in the wheel.

SUMMARY OF THE INVENTION

It is an object of the present invention to provide a wheel and wheel support assembly which is capable of transmitting the torque from the motor vehicle to the wheel without any possibility of slipping and yet which may be easily attached and removed.

The present invention is for a motor vehicle wheel and wheel support assembly for holding a wheel onto a motor vehicle which wheel may be removed by removing the knock-off nut. The assembly comprises the hub adapter comprising a flange having a central axis and brake member contact face. The flange has an outer peripheral edge which is angled and which is in the shape of a polygon. The flange has an appropriate number of lug bolt openings and the angle of the face of the polygon is between about 1° and about 30° with respect to the central axis of the hub adapter. A generally cylindrical knock-off nut accepting portion extends outwardly from the flange and is threaded to accept a knock-off nut. A wheel has a hub which has a flange accepting surface shaped to mate with the polygon on the flange. A knock-off nut secures the wheel hub against the flange to securely hold the wheel to a motor vehicle. Preferably, the angle of the flange and the wheel is about 5° and preferably, the knock-off nut has a tapered surface which fits within a mating tapered surface on the knock-off nut accepting portion of the hub adapter. The polygon is preferably a decagon.

DESCRIPTION OF THE PREFERRED EMBODIMENTS

Figure 1:
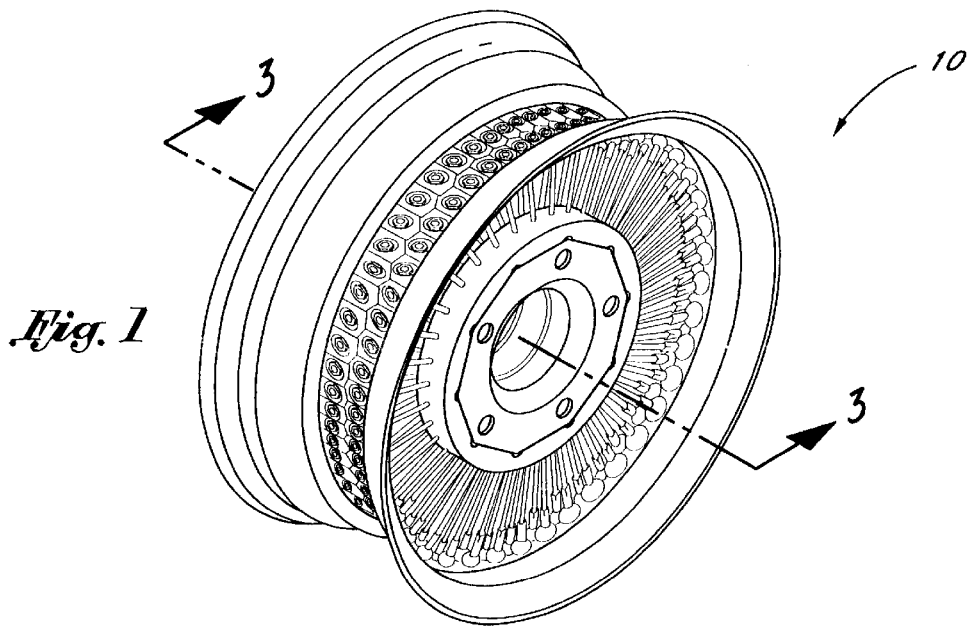
FIG. 1 is a perspective view of the wheel and hub adapter of the present invention.
Figure 2:
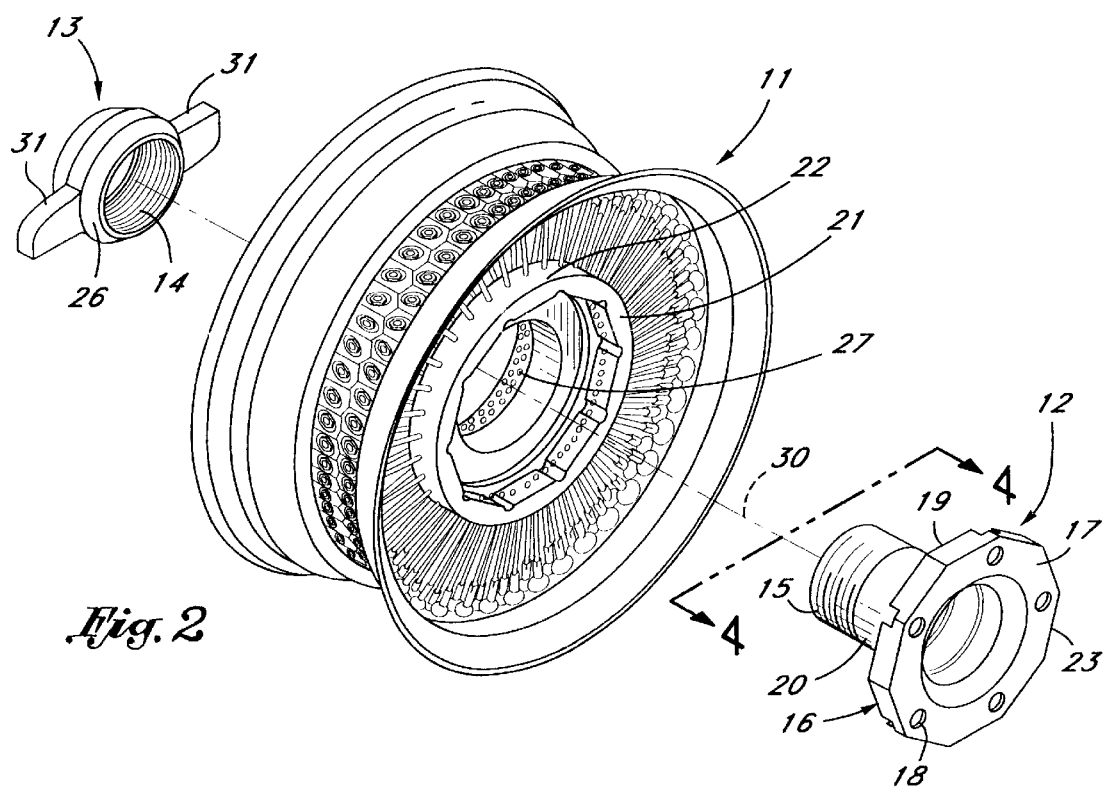
FIG. 2 is an exploded perspective view of the wheel and wheel support assembly of FIG. 1.

The wheel and wheel support assembly of the present invention is shown in perspective view in FIG. 1 and indicated generally by reference character 10. This same assembly is shown in exploded perspective view in FIG. 2 where the wheel is indicated by reference character 11 and a hub adapter by reference character 12. A knock-off nut 13 has internal threads 14 which are threadable onto the external threads 15 of hub adapter 12. Hub adapter 12 has a flange 16 which has a brake member contact face 17 which contacts either a brake drum in the case of drum brakes or a brake disc in the case of disc brakes. Flange 16 has five (5) lug bolt openings 18 which extend from the brake member contact face 17 to a wheel directed face 19. A generally cylindrical knock-off nut accepting portion 20 extends outwardly from the flange 16 and holds external threads 15.

The essential feature of the present invention is the external shape of flange 16 which is referred to as an angled generally polygonal configuration. The particular polygon shown in the drawings is a decagon or ten (10) sided polygon. This mates with the flange accepting surface 21 of hub 22 of wheel 11. Both the outer peripheral edge 23 and the flange accepting surface 21 are formed at a slight angle with respect to central axis 30, which angle is indicated by reference character 24 in FIG. 3. This angle is preferable between 1° and 30° and a preferred angle is about 5°. In this way, the wheel hub may be securely tightened against the hub adapter 12 and yet still may be removed when the knock-off nut 13 is removed.

Figure 3:
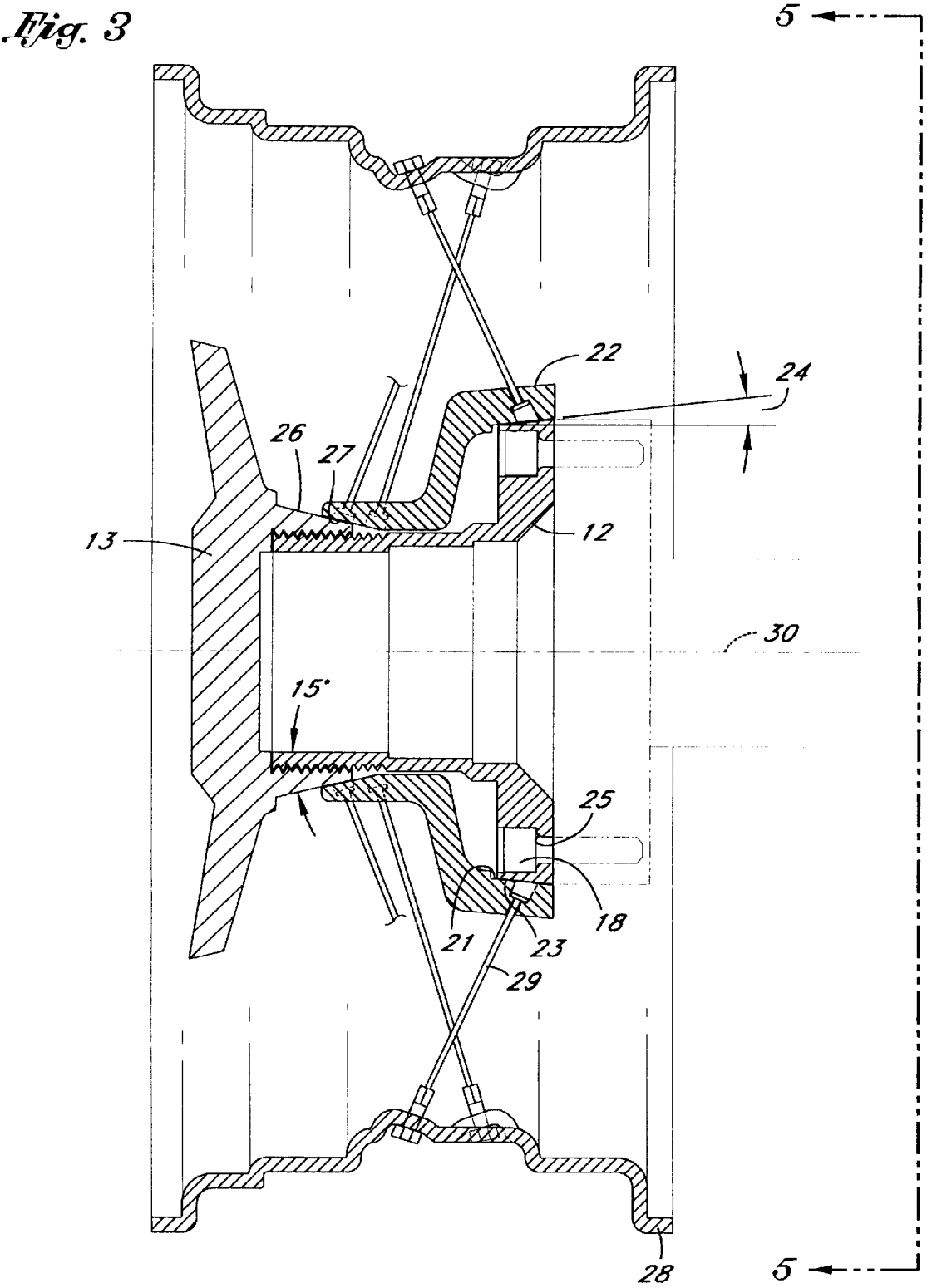
FIG. 3 is a cross-sectional view taken along line 3—3 of FIG. 1.
Figure 4:
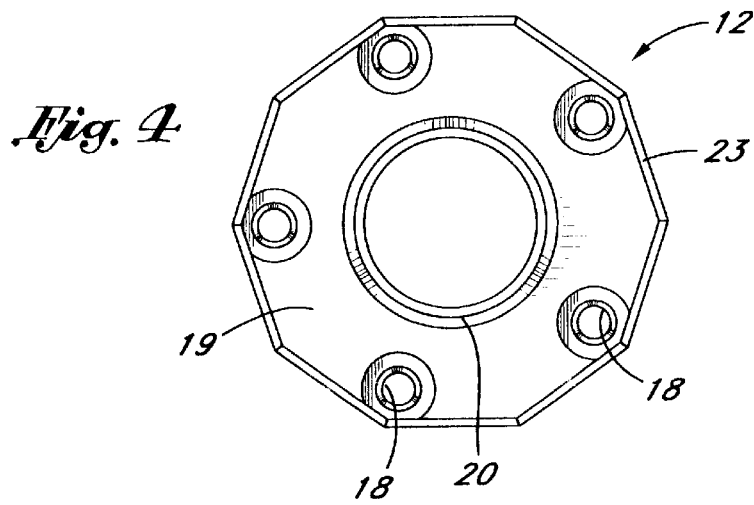
FIG. 4 is an end view of the hub adapter taken along line 4—4 of FIG. 2.
Figure 5:
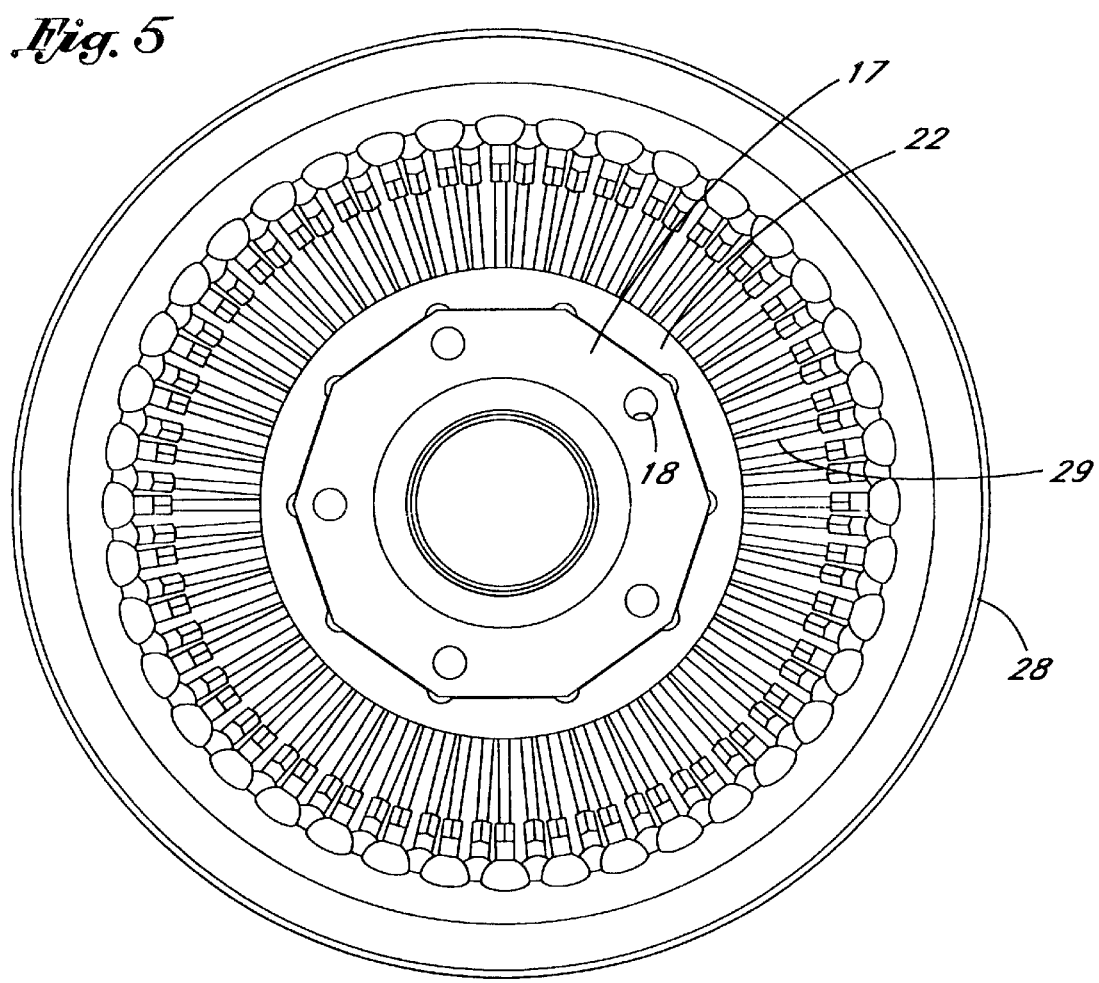
FIG. 5 is a rear view taken along line 5—5 of FIG. 3.

Turning now to FIG. 3, it can be seen that the lug bolt openings 18 are tapered at 25 to accept a conventional lug nut. It can also be seen that the flange accepting surface 21 seats against the outer peripheral edge 23 and is tightened against this surface by knock-off nut 13. Thus, the wheel is accurately centered on hub adapter 12 by the combination of contact between outer peripheral edge 23 and flange accepting surface 21 on the inner edge and between the frusto-conical surface 26 of knock-off nut 13 and the knock-off nut contacting surface 27 of hub 22. Thus, the rim 28 cannot get out of alignment with respect to hub adapter 12, assuming spokes 29 are accurately positioned. It can also be seen in FIGS. 2 and 3 that the interior ends of a row of spokes 29 are terminated in openings which face and terminate in flange accepting surface 21 of hub 22. Thus, the outer peripheral edge 23 of hub adapter 12 covers the openings which hold one of the rows of spokes 29.

In use, a conventional wheel is removed and the hub adapter 12 is secured to the brake drum or brake disc by conventional lug bolts and lug nuts which abut the angled surface 25 in openings 18 of flange 16. This securely holds the brake member contact face 17 against the brake drum or brake disc. Next, the wheel is simply placed over the hub adapter 12 so that its flange accepting surface 21 contacts the outer peripheral edge 23 of hub adapter 12. The wheel is then securely held to the hub adapter by screwing knock-off nut 13 and tightening it so that its frusto-conical surface 26 centers the outer portion of hub 22 with respect to hub adapter 12. Preferably, knock-off nut 13 has a pair of knock-off wings 31 which may be used in connection with a mallet to tighten the knock-off nut 13 onto hub adapter 12. This is also an aesthetically pleasing feature of the assembly of the present invention.

While the term "knock-off nut" has been used herein, it is, of course, to be understood that any other sort of large nut such as a simple hexagonal nut can be used in the place of a knock-off nut with wings. Thus, the term "knock-off nut" has been used in the broad sense to indicate the nut which holds the wheel onto the adapter.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A motor vehicle wire wheel and wheel support assembly for holding a wire wheel onto a motor vehicle which wire wheel may be removed by removing a knock off nut, said wire wheel and wheel support assembly comprising:

a hub adapter comprising:
      a flange having a central axis and a brake member contact face, an outer peripheral edge and a wheel directed face, said flange having a plurality of lug bolt openings parallel to said central axis and passing from said brake member contact face to said wheel directed face and the outer peripheral edge having an angled generally regular polygonal configuration comprising a decagon, the angle of said angled generally regular polygonal configuration comprising a decagon being between one and thirty degrees with respect to said central axis;
      a generally cylindrical knock-off nut accepting portion extending co-axially from said wheel directed face of said flange, said nut accepting portion having an external thread at an outer end thereof;
   a wire wheel having a hub and a rim and a plurality of spokes, said hub including a flange accepting surface shaped to contact the angled generally regular polygonal configuration comprising a decagon of said flange and said flange accepting surface including openings which hold an inner end of a plurality of said plurality of spokes and said hub including a central ring having a knock off nut contacting surface near an exterior end thereof; and
   a knock off nut having an internally threaded nut portion shaped to tighten onto the external thread of said generally cylindrical knock-off nut accepting portion of said hub adapter and to tighten against said wire wheel whereby said wire wheel may be securely and axially held to said hub adapter by placing the flange accepting surface of said wire wheel against the outer peripheral edge of said hub adapter and tightening said knock off nut against said wheel hub.

2. The motor vehicle wire wheel and wheel support assembly of claim 1 wherein the angle of said angled generally polygonal configuration is about five degrees.

3. The motor vehicle wire wheel and wheel support assembly of claim 1 wherein said internal frusto-conical surface has a surface at an angle of about fifteen degrees with respect to said central axis.

4. The motor vehicle wire wheel and wheel support assembly of claim 1 wherein said central ring of said wheel has a knock-off nut contacting internal frusto-conical surface and said knock-off nut has a frusto-conical exterior end positioned to contact the internal frusto-conical surface of said wheel hub.

5. A motor vehicle wheel and wheel support assembly for holding a wire wheel onto a motor vehicle which wire wheel may be removed by removing a knock off nut, said wire wheel and wheel support assembly comprising:

a hub adapter comprising:
      a flange having a central axis and a brake member contact face, an outer peripheral edge and a wheel directed face, said flange having five lug bolt openings parallel to said central axis and passing from said brake member contact face to said wheel directed face and the outer peripheral edge having an angled decagonal configuration, the angle of said angled decagonal configuration being about five degrees with respect to said central axis; and
      a generally cylindrical knock-off nut accepting portion extending co-axially from said wheel directed face of said flange, said nut accepting portion having an external thread at an outer end thereof;
   a wire wheel having a hub and a rim and a plurality of spokes, said hub including a flange accepting surface shaped to contact the angled decagonal configuration of said flange and said flange accepting surface including openings which hold an inner end of a plurality of said plurality of spokes and said hub including a central ring having a knock off nut contacting internal frusto-conical surface near an exterior end thereof; and
   a knock off nut having an internally threaded nut portion shaped to tighten onto the external thread of said generally cylindrical knock-off nut accepting portion of said hub adapter, said knock off nut having a frusto-conical exterior end positioned to contact the internal frusto-conical surface of said wheel whereby said wheel may be securely and axially held to said hub adapter by placing the flange accepting surface of said wheel against the outer peripheral edge of said hub adapter and tightening said frusto-conical portion of said knock off nut against the internal frusto-conical surface of said wheel hub.

6. The motor vehicle wire wheel and wheel support assembly of claim 7 wherein said knock-off nut has a pair of externally directed wings.

* * * * *